//  
United States Patent [19]

Kubo

[11] 4,428,005
[45] Jan. 24, 1984

[54] MODE SELECTING DEVICE FOR A VIDEO SIGNAL REPRODUCING APPARATUS

[75] Inventor: Yoshimi Kubo, Atsugi, Japan

[73] Assignee: Sony Corporation, Tokyo, Japan

[21] Appl. No.: 309,026

[22] Filed: Oct. 6, 1981

[30] Foreign Application Priority Data

Oct. 6, 1980 [JP] Japan .................. 55-139622

[51] Int. Cl.³ ............................. H04N 5/76
[52] U.S. Cl. .................. 360/10.3; 360/137; 200/DIG. 34
[58] Field of Search ............ 360/10.1, 10.2, 10.3, 360/14.1, 137; 200/DIG. 34; 250/231 SE, 232, 233; 74/503, 504

[56] References Cited

U.S. PATENT DOCUMENTS 4,139,872 2/1979 Tachi ................... 360/10.3
4,161,001 7/1979 Sakamoto ............ 360/10.3

FOREIGN PATENT DOCUMENTS

2813148 12/1978 Fed. Rep. of Germany .

Primary Examiner—Bernard Konick
Assistant Examiner—Donald McElheny, Jr.
Attorney, Agent, or Firm—Lewis H. Eslinger; Alvin Sinderbrand

[57] ABSTRACT

A mode selecting device for a video tape reproducing apparatus of the type in which a magnetic tape is transported past rotary magnetic heads, includes a control shaft adapted to rotate about an axis, a control knob connected to the upper end of the control shaft for manually controlling the rotation of the control shaft, a photo-disk rotatable with the control shaft, a pair of photo-detectors associated with the photo-disk for detecting the rotational speed, the angular position and the direction of rotation of the control shaft about the axis, a latch mechanism for maintaining the control shaft in either a first or second axial position along the axis and for effecting successive change-overs between the first and second axial positions in response to successive depressions of the control knob, the speed of movement of the tape being controlled in response to the detection of the angular position when the control shaft is maintained in the first axial position and the speed of movement of the tape being controlled in response to the detection of the rotational speed when the control shaft is maintained in the second axial position.

22 Claims, 12 Drawing Figures

MODE SELECTING DEVICE FOR A VIDEO SIGNAL REPRODUCING APPARATUS

BACKGROUND OF THE INVENTION

1. Field of the Invention

This invention relates generally to video signal reproducing apparatus and, more particularly, is directed to a device for selecting the mode of operation in a video signal reproducing apparatus.

2. Description of the Prior Art

When an existing magnetic video tape recorder (VTR) of the helical scan type is operated in its reproducing or playback mode with a time base corrector, the speed at which the tape is transported or moved longitudinally between the supply and take-up reels may be varied while the rotary magnetic heads are rotated at the frame frequency so as to provide, on a monitor, a still, slow-motion or fast-motion reproduced picture in dependence on the speed of movement of the tape. Known VTRs have conventionally utilized electric circuits including, for example, an electro-magnetic clutch or a plunger-type solenoid, for selecting the above modes of operation, in addition to the rewind mode. Although such arrangements are relatively simple in construction, the electric circuits utilized therein are relatively expensive. It has also been proposed to utilize mechanical mode selectors for selecting predetermined modes of operation. However, such latter selectors are inferior in operation to the aforementioned electric circuits and tend to be of a relatively large size, thereby occupying excessive space and resulting in a more expensive arrangement. Further, with such mechanical arrangements, it is difficult to add functions to the apparatus and accordingly, only minimum requisite functions are provided.

Further, in many instances, it is desirable to manually control the speed and direction of movement of the tape. Accordingly, a so-called "joy-stick" control knob or lever has been provided for controlling the speed and direction of movement of the tape in dependence on the movement of the control knob. For example, in U.S. Pat. No. 4,161,001, which issued on July 10, 1979 and which has a common assignee herewith, the speed and direction of movement of the tape is controlled in accordance with the rotational speed and direction of a manually actuable control knob. On the other hand, in U.S. Pat. No. 4,139,872, which issued on Feb. 13, 1979 and which also has a common assignee herewith, the speed and direction of the tape is controlled in dependence on the angular extent and direction of a manually actuable control knob from a neutral position at which movement of the tape is halted. A VTR provided with the foregoing so-called "joy stick" control may be used for arbitrarily selecting a particular track on a tape at which a reproducing operation is to be commenced, for example, as during editing of the tape.

It should be appreciated that the manually actuable control knobs in the aforementioned VTRs operate in a different manner from each other. In particular, in the latter U.S. Pat. No. 4,139,872, continuous movement of the tape at a desired speed can be controlled without the necessity of the operator continuously rotating the manually actuable control knob. However, with such arrangement, it becomes difficult to accurately stop the tape with a selected track precisely positioned for scanning by the rotary magnetic heads since, to do so, requires repeated to and fro displacements of the control knob. The former U.S. Pat. No. 4,161,001, which controls the speed and direction of movement of the tape in accordance with the speed and direction of rotation of the control knob, cures this deficiency. However, as to the former operation, that is, for controlling movement of the tape continuously at a desired speed, the control knob must be manually rotated at a constant speed which, of course, becomes extremely difficult, if not impossible. It is therefore desirable to provide a control knob which combines both of the above operations into a single mechanism.

OBJECTS AND SUMMARY OF THE INVENTION

Accordingly, it is an object of this invention to provide a device for selecting the mode of operation in a video signal reproducing apparatus that avoids the abovedescribed difficulties encountered with the prior art.

More particularly, it is an object of this invention to provide a mode selecting device which is relatively easy to operate and provides accurate control in the selected modes of operation.

It is another object of this invention to provide a mode selecting device which is adapted to operate in a "jog mode" and a "shuttle mode" for performing a track searching operation.

It is still another object of this invention to provide a mode selecting device for controlling the speed and direction of movement of a magnetic tape in both a "jog mode" and a "shuttle mode" and which is adapted to change over between such modes merely by depression of a control knob.

In accordance with an aspect of this invention, a device for selecting the mode of operation in an apparatus for reproducing information signals recorded on a record medium during movement of the latter, includes rotation means adapted to rotate about an axis; rotation detecting means for detecting the rotational speed and the angular position of the rotation means about the axis; and latch means for maintaining the rotation means in either a first or second axial position along the axis, the speed of movement of the record medium being controlled in response to the detection of the angular position when the rotation means is maintained in the first axial position and the speed of movement of the record medium being controlled in response to the detection of the rotational speed when the rotation means is maintained in the second axial position.

The above, and other, objects, features and advantages of the present invention, will be apparent in the following detailed description of an illustrative embodiment which is to be read in connection with the accompanying drawings.

DETAILED DESCRIPTION OF A PREFERRED EMBODIMENT

Referring now to the drawings, and initially to FIGS. 1A–1D and 9 thereof, there is shown a mode selecting device having particular utility in a video signal reproducing apparatus (VTR) of the helical scan type which is adapted to reproduce signals recorded on a magnetic tape during movement of the latter. In particular, the mode selecting device according to this invention is intended as an improvement over the manually actuable control knob assemblies shown in U.S. Pat. Nos. 4,139,872 and 4,161,001, issued Feb. 13, 1979 and July 10, 1979, respectively, both having a common assignee herewith, and the disclosures of which are incorporated herein by reference. As shown in the drawings, the mode selecting device according to this invention includes upper and lower frame members 1 and 2 for mounting the device to a video signal reproducing apparatus (not shown). The device further comprises a rotatable control shaft 3 having a manually actuable control knob 6 coaxially fixed to the upper end thereof, with control shaft 3 being rotatably and axially movable within upper and lower holders 4 and 5 which are secured to frame members 1 and 2, respectively. A more detailed discussion of the above and other elements of the mode selecting device according to the present invention will now be discussed.

Figure 1A:
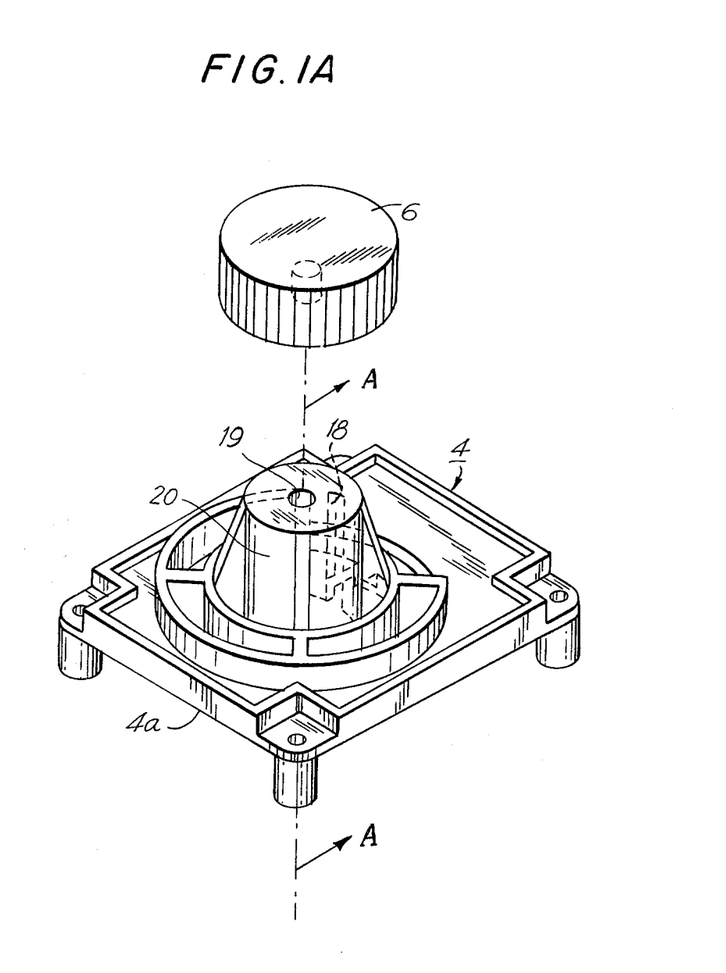
FIGS. 1A–1D are exploded perspective views of portions of the mode selecting device of FIG. 9.
Figure 1B:
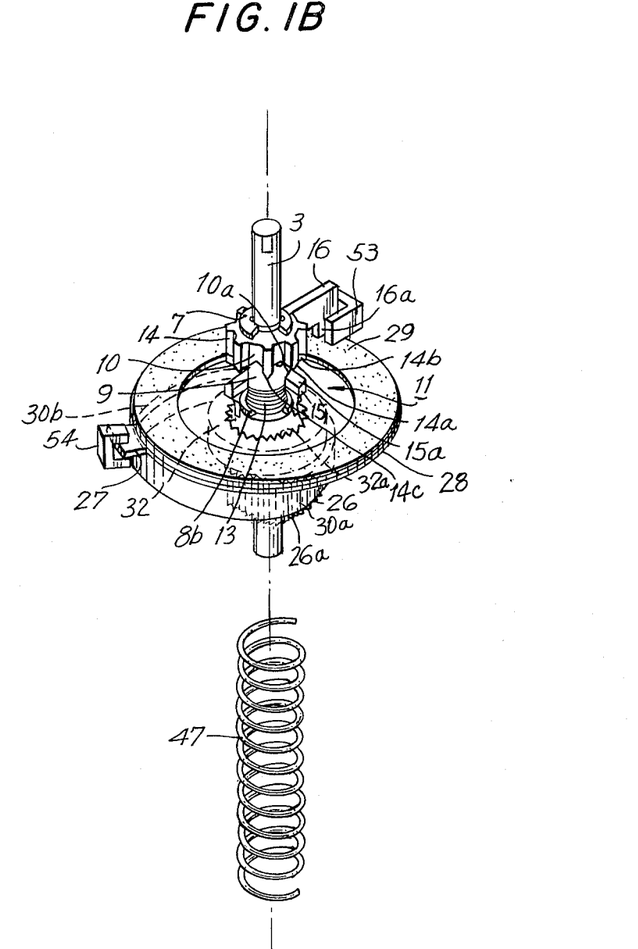
Figure 1C:
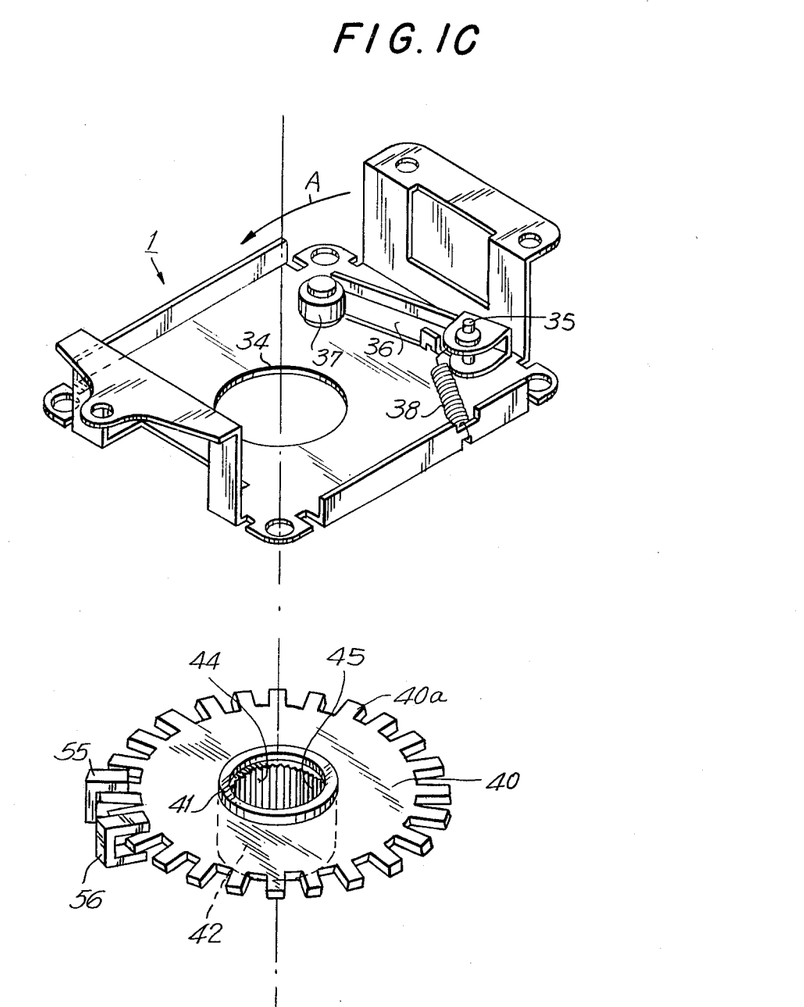
Figure 1D:
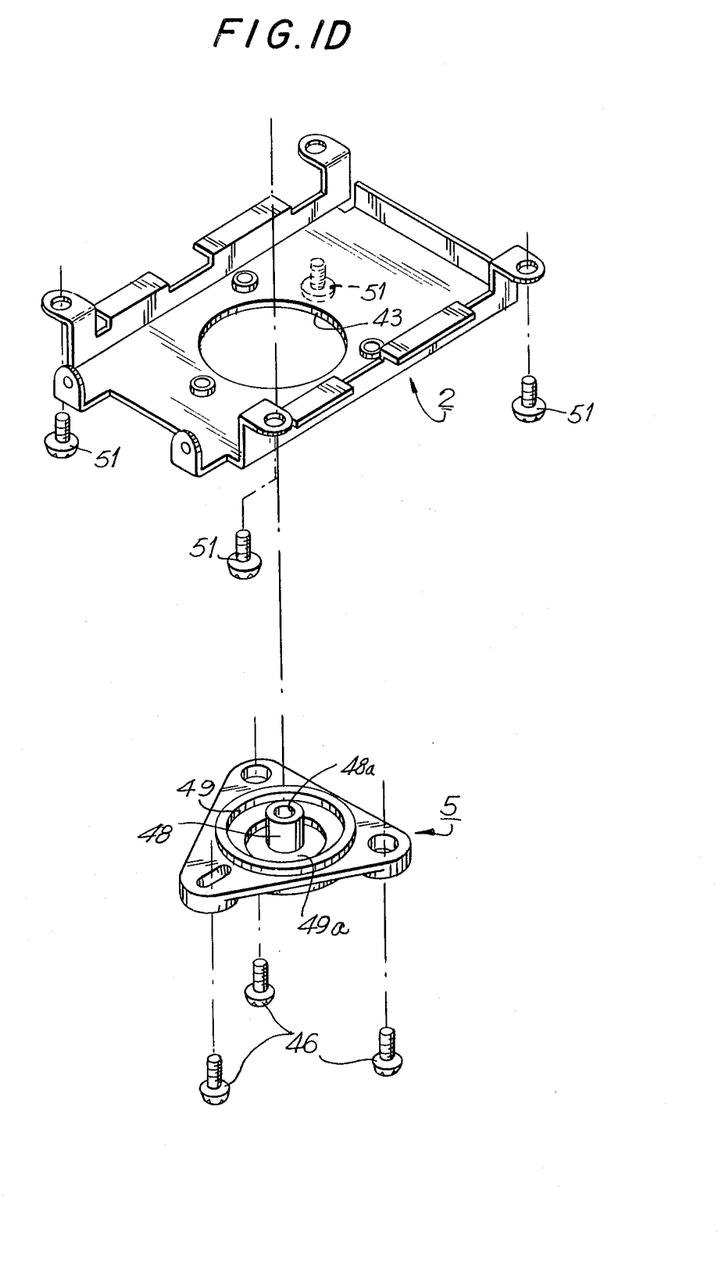
Figure 2:
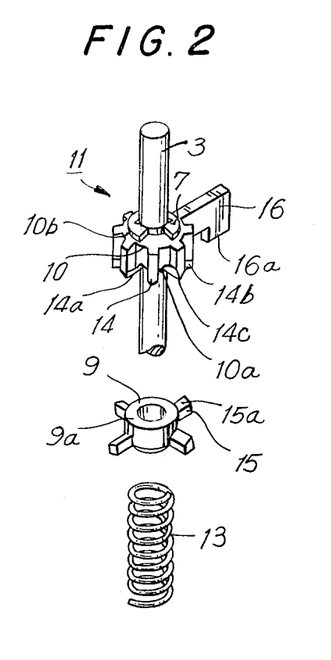
FIG. 2 is an exploded perspective view of a latch mechanism that is used in that portion of the mode selecting device shown in FIG. 1B.
Figure 3:
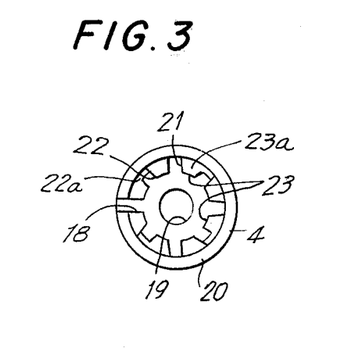
FIG. 3 is a bottom plan view of a guide sleeve of an upper holder that is used in that portion of the mode selecting device shown in FIG. 1A.
Figure 6:
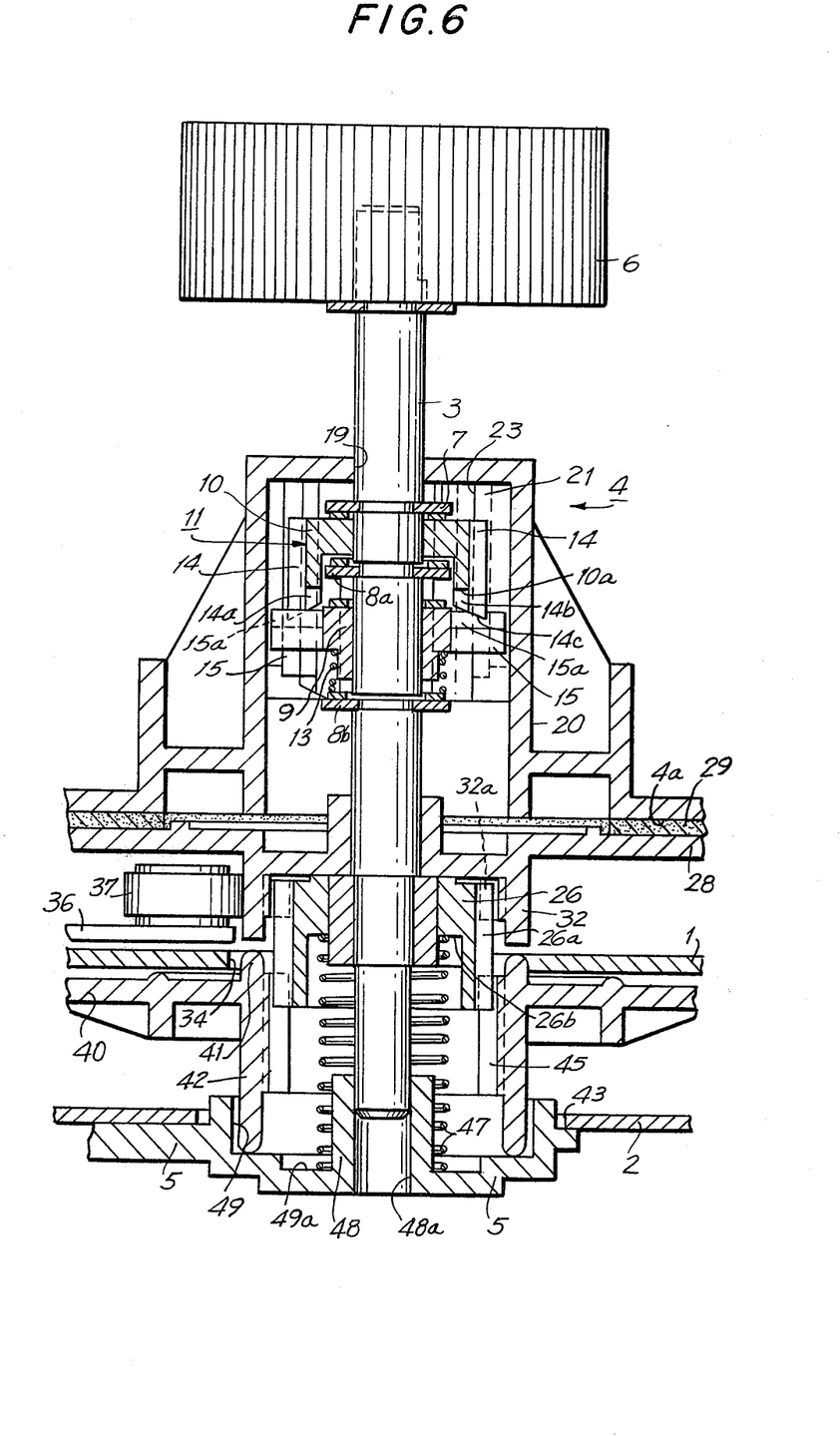
FIG. 6 is a cross-sectional view of the mode selecting device of FIG. 9, taken along line B—B thereof, and illustrated in the shuttle mode position.

Referring first to FIGS. 1D, 2 and 6, a latch mechanism 11 including a selection member 9 and a guide member 10 is mounted on control shaft 3 between three E-rings 7, 8a and 8b, the latter being fixedly mounted on control shaft 3. Selection member 9 is axially and rotatably movable on control shaft 3, while guide member 10 is only rotatably movable with respect to control shaft 3. As shown more particularly in FIG. 2, guide member 10 includes a cylindrical hub 10b rotatably mounted on control shaft 3 and having a plurality of, for example, eight, radially extending arms 14 which are equally spaced apart along the outer circumferential surface of hub 10b and which extend axially along the height of hub 10b. In this manner, notches 10a are formed at the lower end of hub 10b between arms 14. The lower end of each arm 14, in the longitudinal or heightwise direction thereof, includes a V-shaped claw 14c formed of tapered surfaces 14a and 14b which converge from opposite sides of each arm 14 at an approximately 45° angle. In like manner, selection member 9 is formed of a cylindrical hub 9a which is rotatably and axially movable along control shaft 3 and includes four radially extending arms 15 which are spaced apart along the outer circumferential surface of hub 9a by 90°, with arms 15 extending outwardly in the radial direction to a larger extent than arms 14. The upper end of each arm 15 is formed with a tapered surface 15a which is inclined at an approximately 45° angle in a predetermined direction with the direction of inclination of each of surfaces 15a being identical. Selection member 9 is biased toward upper E-ring 7 by a return spring 13 situated between lower E-ring 8b and selection member 9.

The present invention includes an L-shaped guide plate 16 integrally formed on the outer circumferential surface of hub 10b in place of one of arms 14 and includes a claw (not shown) which is substantially identical to claws 14c of arms 14 and functions in an identical manner. Guide plate 16 extends from guide member 10 through a vertical guide slit 18 formed in upper holder 4, as shown in FIG. 1A, whereby guide member 10 is prevented from rotating although, it should be appreciated, control shaft 3 is still rotatable within guide member 10. In this manner, the axial position of a tab 16a at the free end of guide plate 16 which extends from slit 18 can be detected for determining the mode of operation of the device. Further, the axial movement of guide member 10, and thereby control shaft 3, in the upward direction, as viewed in FIG. 6, is limited by guide plate 16 which abuts against the upper end of guide slit 18.

Figure 4:
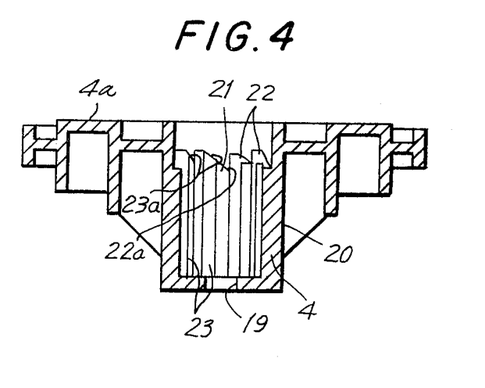
FIG. 4 is a cross-sectional view of an upper holder that is used in that portion of the mode selecting device shown in FIG. 1A, taken along lines A—A thereof.

As shown in FIGS. 1A and 6–8, upper holder 4 is integrally formed with a cylindrical, upstanding guide sleeve 20 in which the aforementioned guide slit 18 is formed, and has a shaft guide aperture 19 at its upper end through which the upper end of control shaft 3 is inserted. In this manner, when control shaft 3 is inserted through aperture 19, control knob 6 is fixedly secured thereto so as to control the rotatable and axial movement of control shaft 3. As shown more particularly in FIGS. 3, 4 and 6–8, the inner circumferential surface of guide sleeve 20 includes four equally spaced, deep axial grooves 21 and four equally spaced, shallow axial grooves 22 situated between the deep grooves 21. In other words, grooves 21 and 22 are all equally spaced about the inner circumferential surface of guide sleeve 20 with the deep grooves 21 and shallow grooves 22 being arranged adjacent one another in an alternating manner. The lower ends of the guides 23 separating adjacent ones of grooves 21 and 22 are formed with tapered surfaces 23a which are inclined in the same direction, as shown in FIG. 4, and which extend into the shallow grooves 22 to form limit surfaces 22a therein. In this manner, shallow grooves 22 are formed with a lesser axial dimension than deep grooves 21. The limit surfaces 22a, however, have a radial dimension less than guides 23 so that movement of arms 15 in the upward, vertical or axial direction in shallow grooves 22 is limited, while the shorter arms 14, which have a radial dimension less than that necessary to contact limit surfaces 22a, are not so limited.

Figure 7:
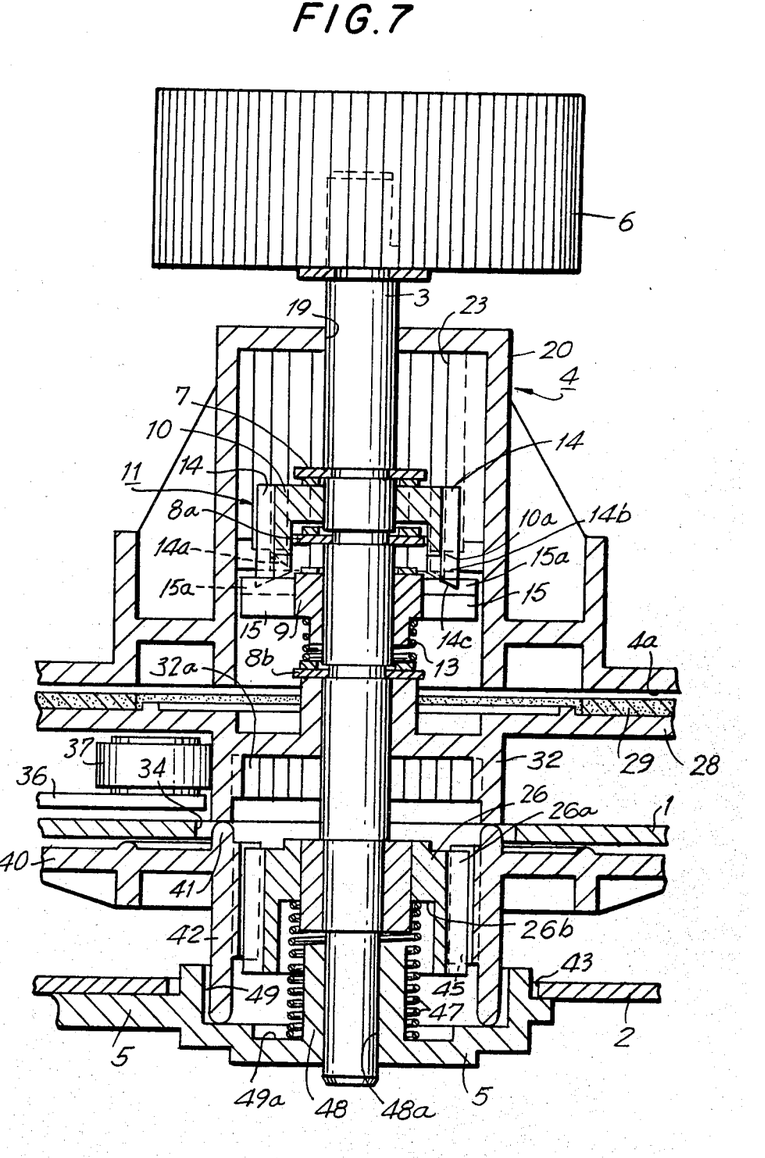
FIG. 7 is a cross-sectional view of the mode selecting device of FIG. 6, illustrated in the mode changing position.
Figure 8:
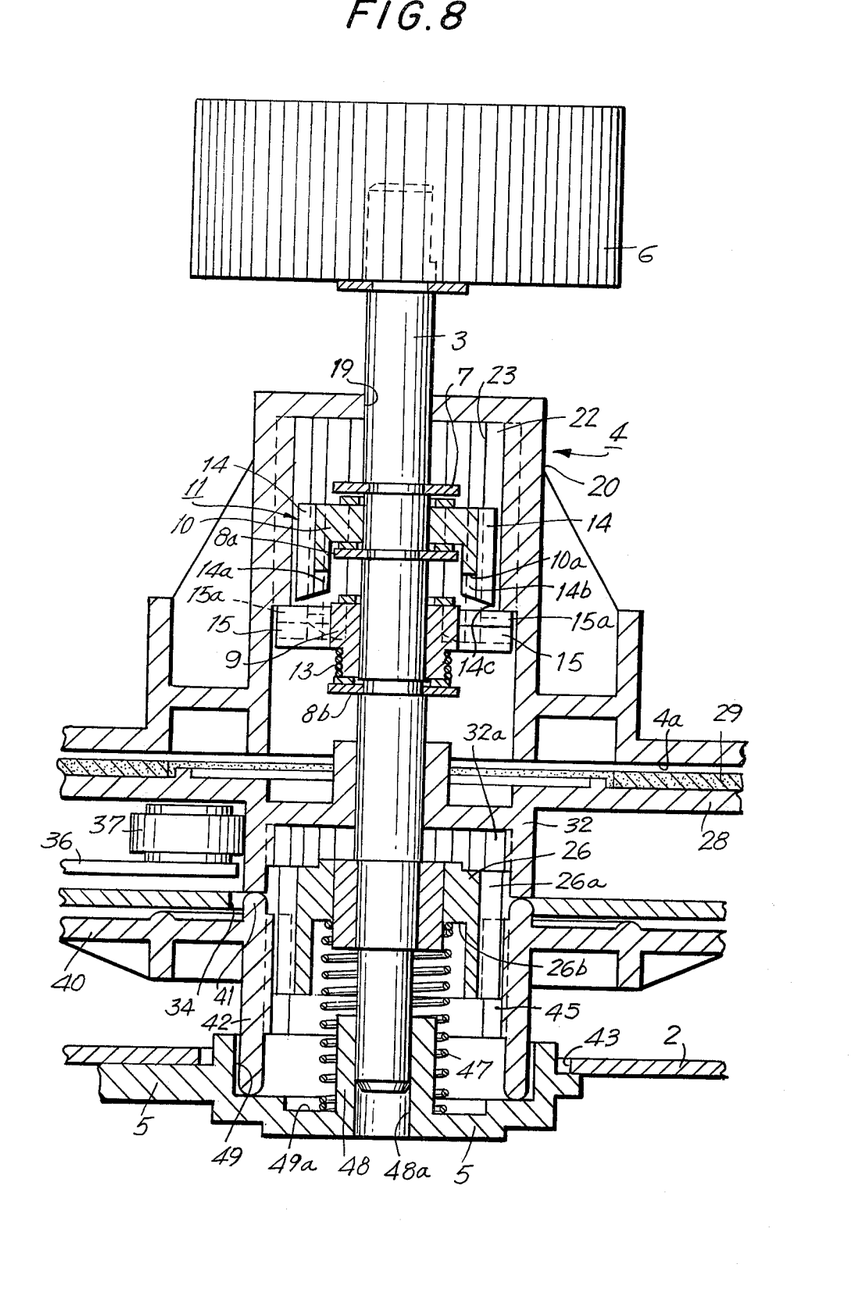
FIG. 8 is a cross-sectional view of the mode selecting device of FIG. 6, illustrated in the jog-mode position.

Radial arms 14 of guide member 10 are positioned within grooves 21 and 22 so as to move vertically or axially therein, as shown in FIGS. 6–8. Thus, when control shaft 3 is in the position shown in FIG. 6, a compression spring 47 at the lower end thereof, as will be discussed hereinafter, biases control shaft 3 upwardly, whereby arms 15 are maintained in shallow grooves 22. Depression of control knob 6 causes control shaft 3 to be moved in the downward axial direction, as viewed in FIG. 7. As a result, arms 14 of guide member 10 are moved with control shaft 3 so that claws 14c thereof bias arms 15 out of shallow grooves 22. Since selection member 9 is biased by return spring 13, and because of the inclinations of the surfaces which form claws 14c and the tapered surfaces 15a of radial arms 15, arms 15 are caused to rotate slightly so that tapered surfaces 15a are positioned in opposing relation to tapered surfaces 23a of guides 23. Thereafter, upon release of control knob 6, coil spring 47 biases control shaft 3 upwardly, as viewed in FIG. 8. Because of the relative inclinations between tapered surfaces 15a and 23a, arms 15 are biased by coil spring 47 into deep grooves 21. Accordingly, upon each depression and release of control knob 6, radial arms 15 are alternately positioned in the deep and shallow grooves 21 and 22 to thereby maintain control shaft 3 in first and second axial positions.

Figure 5:
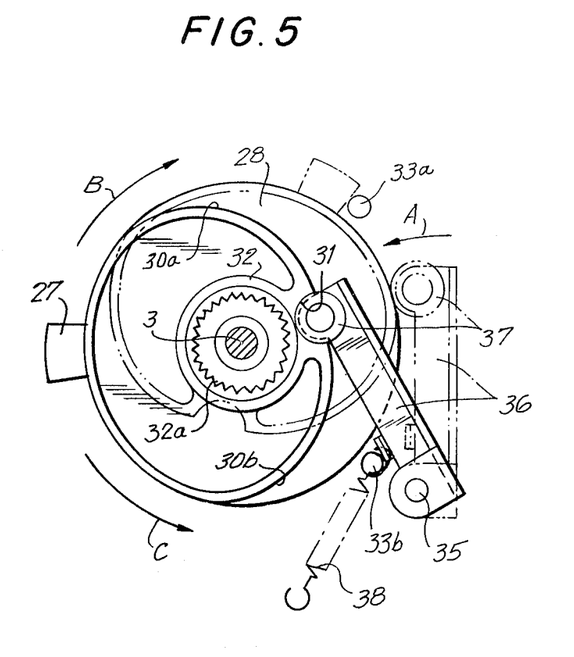
FIG. 5 is a bottom plan view of a friction member that is used in that portion of the mode selecting device shown in FIG. 1B.

A drive gear 26 having radially extending drive teeth 26a at its outer circumferential surface is coaxially secured to the lower portion of control shaft 3 below the aforementioned latch mechanism 11. A circular friction plate 28 having a shutter plate 27 extending radially from the outer circumference thereof is rotatably and axially mounted along control shaft 3 between E-ring 8b and drive gear 26, and is limited in its rotational movement by a pair of stops 33a and 33b extending from the lower surface of upper holder 4 and against which shutter plate 27 abuts during rotational movement of friction plate 28, as shown in FIG. 5. An annular brake shoe 29 is adhered to the upper surface of friction plate 28 and is adapted to frictionally engage a brake disk 4a formed at the lower surface of upper holder 4, when brake shoe 29 is biased into engagement therewith, that is, when compression spring 47 biases control shaft 3 in the upward, axial direction into the first axial position, as viewed in FIG. 6. Further, a pair of cam surfaces 30a and 30b are eccentrically formed on the lower surface of friction plate 28 and converge at a center or navel groove 31. In addition, a clutch ring 32 is formed at a central portion on the lower surface of friction plate 28 between cam surfaces 30a and 30b and includes clutch teeth 32a formed at the inner circumferential surface thereof, which teeth are adapted to engage with drive teeth 26a of drive gear 26. As shown in FIG. 1C, the upper frame member 1 onto which upper holder 4 is mounted, includes a guide aperture 34 through which drive gear 26 is adapted to axially move during axial movement of control shaft 3 to which it is mounted. In this manner, drive gear 26 is adapted to be positioned into and out of meshing engagement with clutch ring 32 during axial movement of control shaft 3 in the first and second axial positions, respectively. Thus, when drive gear 26 is engaged with clutch ring 32 when control shaft 3 is maintained in its first axial position, rotation of control shaft 3 to a desired angular position will be maintained as a result of the frictional engagement of brake shoe 29 with brake disk 4a.

Further, a bias arm 36 is pivotally mounted by a pivot pin 35 to the upper surface of upper frame member 1 and includes a roller 37 at the free end thereof. As shown in FIG. 1C, bias arm 36 is normally biased by an expansion spring 38 in the direction of arrow A so that roller 37 is always biased into engagement with one of cam surfaces 30a and 30b or with navel groove 31. Thus, when brake shoe 29 is positioned out of frictional engagement with brake disc 4a so that friction plate 28 is adapted to freely rotate about control shaft 3, that is, when control shaft 3 is maintained in its second axial position, the biasing force of roller 37 on cam surfaces 30a and 30b causes friction plate 28 to be rotated to a neutral or center position in which roller 37 is engaged in navel groove 31.

An annular photo-disk 40 is positioned coaxially with control shaft 3 between upper frame member 1 and lower frame member 2, as shown in FIGS. 6–8. The periphery of disk 40, as shown in FIG. 1C, is formed with spaced apart cutouts defining, for example, twenty-four radially directed light shielding portions 40a between the successive cutouts. As will be hereinafter discussed, two angularly spaced apart photo-couplers 55 and 56 are associated with photo-disk 40 so as to constitute first and second pulse generators providing first and second pulse signals of different phases, with the phase relation of such first and second pulse signals being dependent on the direction of rotation of shaft 3 and control knob 6. Photodisk 40 includes a central aperture 44 having internal gear teeth 45 adapted to engage with the teeth 26a of drive gear 26. Surrounding aperture 44 and on opposing surfaces of photo-disk 40 are cylindrical collars 41 and 42, with upper collar 41 being positioned for rotatable movement within aperture 34 of upper frame member 1 and lower collar 42 being positioned for rotatable movement within an aperture 43 of lower frame member 2.

The aforementioned lower holder 5 is secured to the lower surface of lower frame member 2 by means of three set screws 46. Lower holder 5 is formed at its upper surface with a circular depression which forms an outer disk hold groove 49 for rotatably supporting the lower end of collar 42 of photodisk 40 therein. An inner spring hold groove 49a is also formed in the depression and provides a fixed surface against which one end of a compression spring 47 is positioned, the other end of the compression spring extending through aperture 43 of lower frame member 2 into biasing engagement with a groove 26b formed in drive gear 26. In this manner, compression spring 47 normally biases drive gear 26, and thereby control shaft 3, in the upward, axial direction, as viewed in FIG. 6. A guide sleeve 48 is centrally formed within spring hold groove 49a and includes a central bore 48a through which control shaft 3 is adapted to be positioned for rotational and axial movement therein. Disk hold groove 49, spring hold groove 49a and guide sleeve 48 are all formed coaxially with aperture 43 of lower frame member 2 and with control shaft 3.

Figure 9:
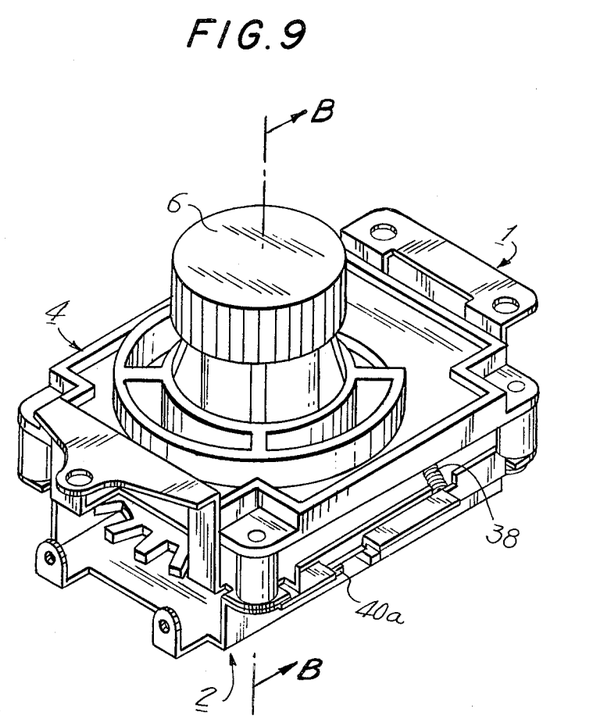
FIG. 9 is a perspective view of a mode selecting device according to one embodiment of this invention.

It should be appreciated that the mode selecting device according to this invention is constructed in the order shown in FIGS. 1A–1D, which illustrates the mode selecting device of FIG. 9 blown apart. In particular, control shaft 3, having the assembly of FIG. 1B thereon, is inserted through aperture 19 of upper holder 4, and control knob 6 is then secured thereto. Upper frame member 1 is then positioned in alignment with upper holder 4, and photo-disk 40 and compression spring 47 are positioned over control shaft 3 and through aperture 34 of upper frame member 1. Lower frame member 2, with lower holder 5 secured thereto, is then positioned over compression spring 47 and photo-disk 40, as previously discussed, wherein upper holder 4, upper frame member 1 and lower frame member 2 are then secured to one another by set screws 51. With this arrangement, control shaft 3 is axially and rotatably mounted within the device. In particular, control shaft 3 is rotatably and axially mounted at its upper end through aperture 19 of upper holder 4 and at its lower end through guide sleeve 48 of lower holder 5.

In a preferred embodiment of this invention, four photo-couplers 53, 54, 55 and 56 are provided, each of which may include a light emitting element and a light receiving element positioned opposite to one another with a space therebetween. In particular, photo-coupler 53 functions as a mode detector for detecting the axial position of tab 16a to determine whether control shaft 3 is in its first or second axial position. Photo-coupler 54 functions as a position detector for detecting whether shutter plate 27 is at its center rotational or neutral position. This occurs, of course, when roller 37 is positioned within navel groove 31, so that shutter plate 27 is centrally positioned between stops 33a and 33b. Photo-couplers 55 and 56 function as rotation detectors, each of which includes a light emitting element for directing a light beam across the peripheral portion of photo-disk 40 to a respective light receiving element at the opposite side of the plane of rotation. Thus, when disk 40 is rotated with rotation of control knob 6, the light emitted from each light emitting element toward the respective light receiving element is intermittently blocked by successive light shielding portions 40a of disk 40 with the result that each of photo-couplers 55 and 56 provides alternating signals or pulses. Furthermore, the angular spacing between photo-couplers 55 and 56 is selected so that the alternating signals or pulses derived therefrom, upon turning of control knob 6, will have a phase difference of 90° therebetween. In this manner, photo-couplers 55 and 56 are able to detect the rotational direction, speed and angular extent of control shaft 3 in response to the rotation of photo-disk 40.

In operation, the mode selecting device according to present invention is designed to control operation of a video signal reproducing apparatus in a jog mode or a shuttle mode to effect a track selecting operation. The shuttle mode of operation corresponds to the operation in the aforementioned commonly assigned U.S. Pat. No. 4,139,872 in which the speed and direction of transport of the magnetic tape are determined in accordance with the angular extent and direction of rotation of control knob 6. On the other hand, the jog mode of operation corresponds to the operation of the aforementioned commonly assigned U.S. Pat. No. 4,161,001 in which the speed and direction of movement of the tape is varied in accordance with the speed and direction of rotation of control knob 6. It should be appreciated that with either of such modes of operation, a mode selecting mechanism (not shown) of the VTR must be actuated to disengage the normal control functions and permit the mode selecting device according to this invention to control the transport of the tape.

A description of the shuttle mode of operation with the present invention will now be described. Before the shuttle mode is selected, however, the mode selecting device is operating in its jog mode of operation in which brake shoe 29 is out of frictional engagement with brake disk 4a. This means that friction plate 28 is free to rotate and thereby, roller 37, by means of its cam action with cam surfaces 30a and 30b, is positioned within navel groove 31 so that control shaft 3 and shutter plate 27 are maintained in the center rotational or neutral position. Upon depression of control knob 6, control shaft 3 and guide member 10 secured thereto move downwardly in the vertical or axial direction, as viewed in FIG. 6, against the action of compression spring 47, to bias radial arms 15 of selection member 9 out of shallow grooves 22. However, as aforementioned, because of the inclinations of the surfaces 14a and 14b which form claws 14c and the inclination of tapered surfaces 15a of radial arms 15, the force of return spring 13 in biasing tapered surfaces 15a into engagement with claws 14c causes arms 15 to rotate so as to be positioned in notches 10a of guide member 10 and in opposing relation to tapered surfaces 23a of guide 23. When the depression force on control knob 6 is released, compression spring 47 biases drive gear 26, and thereby, control shaft 3 in the upward, axial direction. Because of the relative inclinations between tapered surfaces 15a and 23a, radial arms 15 are rotated and then biased into deep grooves 21 of guide sleeve 20.

Since the vertical extent within which control shaft 3 is adapted to move is now increased, drive gear 26 is biased upwardly into meshing engagement with clutch ring 32 and, in particular, clutch teeth 32a thereof, whereby rotation of control knob 6 results in a consequent rotation of friction plate 28. At the same time, compression spring 47, through drive gear 26, biases friction plate 28 upwardly, as viewed in FIG. 6, whereupon brake shoe 29 frictionally engages with brake disk 4a of upper holder 4. It should be appreciated, that because of such frictional engagement, control knob 6 can not be freely rotated at a substantially constant speed by imparting an initial rotational force. Further, drive gear 26 is also positioned in meshing engagement with teeth 45 of photo-disk 40, as shown in FIG. 6. Also, in the shuttle mode of operation, tab 16a of guide plate 16 is displaced upwardly from between the light emitting element and light receiving element of mode detector 53. In this manner, mode detector 53 produces a signal for actuating a circuit of the video signal reproducing apparatus corresponding to the shuttle mode of operation.

Further, as previously discussed, at the beginning of the shuttle mode of operation, roller 37 is positioned within navel groove 31, whereby friction plate 28 is arranged in a center rotational or neutral position, as shown by solid lines in FIG. 5. It should be appreciated that, at this position, shutter plate 27 is positioned between the light emitting element and light receiving element of center position detector 54 and this latter detector produces a signal corresponding to the still motion mode of the VTR, whereby no movement of the tape results. However, during rotation of control knob 6, roller 37 is biased into contact with one of cam surfaces 30a or 30b of friction plate 28 and, because of the frictional engagement of brake shoe 29 and brake disk 42, the angular extent of rotation of control knob 6 is maintained at a desired position, for example, as shown by the dot-dash line in FIG. 5. It is to be remembered, however, that the angular extent of rotation of friction plate 28 is limited by stops 33a and 33b. In any event, in this mode of operation, rotation of control knob 6 causes friction plate 28 and photo-disk 40 to rotate together by means of drive gear 26.

During rotation of control knob 6, shutter plate 27 is displaced from position detector 54 and thereby, the latter no longer controls the video signal reproducing apparatus to operate in its still mode of operation. Further, as previously discussed, rotation of control knob 6 causes photo-disk 40 to correspondingly rotate. Accordingly, rotation detectors 55 and 56 detect the direction and angular extent of rotation of control knob 6 and in accordance therewith, control the direction and speed of movement of the magnetic tape. In particular, when friction plate 28 is rotated in the direction of arrow B in FIG. 5, the light shielding portions 40a of photo-disk 40 are rotated in the same direction, whereupon rotation detectors 55 and 56, in turn, cause the tape to be transported in the forward (FWD) direction in the VTR. As the control knob 6 is further rotated, the number of light shielding portions 40a of disk 40 which cross the path between the light emitting element and the light receiving element of rotation detector 55, is detected and the speed of movement of the magnetic tape is increased in proportion to such detected number. When friction plate 28 is caused to rotate in the opposite direction of arrow C of FIG. 5, the magnetic tape is transported in the reverse direction in response to the output from rotation detectors 55 and 56 and the speed of movement of the tape is controlled in the same manner as discussed above. In this manner, in the shuttle mode of operation, manual rotation of control knob 6 controls the direction and speed of movement of the magnetic tape to any desired value. As a result, particular video information recorded on the tape can be located in a short period of time.

The jog mode of operation, which mode is similar to that described in U.S. Pat. No. 4,161,001, in which the speed and direction of the magnetic tape is varied in accordance with the speed and direction of rotation of the control knob, will now be discussed. To change to this mode of operation, control knob 6, and thereby control shaft 3, are depressed downwardly, as viewed in FIG. 7. As a result, guide member 10, which is axially fixed to control shaft 3, is also displaced in the same direction so as to bias radial arms 15 of selection member 9 out of deep grooves 21, against the action of compression spring 47. Since selection member 9 is biased into engagement with guide member 10 by return spring 13, and because of the relative inclinations of tapered surfaces 15a of radial arms 15, and surfaces 14a and 14b which form claws 14c, when control knob 6 is fully depressed, claws 14c of guide member 10 cause selection member 9 to rotate about control shaft 3 so that radial arms 15 are positioned in notches 10a of guide member 10 and in opposing relation to tapered surfaces 23a of guides 23. Thereafter, upon release of the depression force on control knob 6, compression spring 47 biases drive gear 26, and thereby control shaft 3, upwardly, as viewed in FIG. 8. Because of the relative inclinations between tapered surfaces 15a and 23a, selection member 9 is rotated in a predetermined direction so that radial arms 15 are biased into shallow grooves 22 of upper holder 4, in which the free ends of radial arms 15 are engaged with limiting surfaces 22a. In this manner, control shaft 3 is maintained in the second axial position shown in FIG. 8.

In this latter axial position, drive member 26 is positioned out of meshing engagement with teeth 32a of clutch ring 32. Accordingly, brake shoe 29 is no longer frictionally engaged with brake disk 4a of upper holder 4, whereupon friction plate 28 is free to rotate about control shaft 3. In this manner, because of the cam action between roller 37 and cam surfaces 30a and 30b, friction plate 28 is caused to rotate to its neutral or center rotational position in which roller 37 is positioned within navel groove 31. At this time, shutter plate 27 is in its neutral position between the light emitting element and light receiving element of detector 54, as shown in FIG. 5. It is to be appreciated, however, that in the second axial position shown in FIG. 8, the teeth 26a of drive gear 26 are maintained in meshing engagement with teeth 45 of disk 40. Since drive gear 26 is only engaged with photo-disk 40, the latter disk is free to rotate in either direction without any limits in the angular extent of rotation and without any braking force being applied.

As control knob 6 is rotated, the direction of rotation thereof is detected by rotation detectors 55 and 56, as previously discussed. At the same time, the speed of rotation of control knob is detected by rotation detector 55 which detects the number of light shielding portions 40a passing therethrough. As a result, the magnetic tape is transported in either a forward or reverse direction and at a speed corresponding to the rotational speed of control knob 6. However, when rotation of control knob 6 is halted, position detector 54 causes the VTR to operate in its still mode.

It should be appreciated that each depression of control knob 6 results in the mode selecting device according to this invention passing through the condition shown in FIG. 7 and alternately returning to the positions shown in FIGS. 6 and 8. In this manner, continual depressions of control knob 6 cause the mode selecting device according to this invention to alternate between the jog mode and the shuttle mode of operation.

Having described a specific preferred embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A device for selecting the mode of operation of an apparatus for reproducing information signals recorded on a record medium during movement of the latter, said device comprising:
    rotation means adapted to rotate about an axis;
    rotation detecting means for detecting the rotational speed and the angular position of said rotation means about said axis; and
    latch means for maintaining said rotation means in one of a first and second axial position along said axis, the speed of movement of said record medium being controlled in response to the detection of said angular position when said rotation means is maintained in said first axial position and the speed of movement of said record medium being controlled in response to the detection of said rotational speed when said rotation means is maintained in said second axial position.

2. A device according to claim 1; in which said rotation detecting means includes means coupled to said rotation means and having a plurality of light shielding portions, and photo-coupler means optically associated with said light shielding portions for detecting the rotational speed and the angular position of said rotation means about said axis.

3. A device according to claim 1; in which said rotation means includes a shaft adapted to rotate about said axis, and a control member secured to said shaft for controlling the rotation thereof.

4. A device according to claim 1; in which said rotation means is adapted to move axially along said axis; and said latch means includes guide sleeve means having first and second groove means of different axial dimensions, selection means adapted to be positioned in one of said first and second groove means for maintaining said rotation means in one of said first and second axial positions, respectively, biasing means for biasing said selection means in a first axial direction into one of said first and second groove means, and guide member means for biasing said selection means out of a respective one of said first and second groove means in response to movement of said rotation means in a second axial direction opposite to said first axial direction.

5. A device according to claim 4; in which the axial dimension of said first groove means is greater than the axial dimension of said second groove means.

6. A device according to claim 4; in which said selection means is rotatably and axially mounted on said rotation means and includes at least one radially extending arm adapted to be positioned in one of said first and second groove means, and said guide member means is mounted on said rotation means and includes at least one radially extending arm for biasing said at least one radially extending arm of said selection means out of a respective one of said first and second groove means in response to movement of said rotation means in said second axial direction.

7. A device according to claim 6; in which the at least one radially extending arm of at least one of said selection means and said guide member means includes at least one inclined surface, and said biasing means includes first spring means for biasing said selection means towards said guide member means in said first axial direction so that said selection means is rotated about said rotation means by a predetermined angular extent when said at least one radially extending arm of said guide member means biases said at least one radially extending arm of said selection means out of said respective one of said first and second groove means.

8. A device according to claim 7; in which said first and second groove means are separated by guide sections, at least one of said at least one radially extending arm of said selection means and said guide means having at least one inclined surface, and said biasing means includes second spring means for biasing said rotation means in said first axial direction so that said selection means is rotated about said rotation means by a predetermined angular extent and biased into one of said first and second groove means.

9. A device according to claim 8; in which said first groove means includes a plurality of first axial grooves of a first axial dimension, said second groove means includes a plurality of second axial grooves of a second axial dimension different from said first axial dimension, and said first and second axial grooves are circumferentially arranged in an alternating manner about said guide sleeve means.

10. A device according to claim 1; further including friction means for maintaining said rotation means at a desired angular position when the latter is maintained in said first axial position.

11. A device according to claim 10; in which said friction means includes brake shoe means axially and rotatably movable with respect to said rotation means and brake disk means, and said device further includes biasing means for biasing said brake shoe means into frictional engagement with said brake disk means when said rotation means is maintained in said first axial position.

12. A device according to claim 1; further including limiting means for limiting the angular extent of rotation of said rotation means when the latter is maintained in said first axial position.

13. A device according to claim 1; further including friction means for maintaining a desired rotational position of said rotation means when the latter is maintained in said first axial position, said friction means being adapted to engage with said rotation means for rotating therewith when said rotation means is maintained in said first axial position.

14. A device according to claim 13; in which said rotation means includes a control shaft adapted to rotate about said axis and having a drive gear fixedly mounted thereon, and said friction means includes an annular member having a central aperture through which said control shaft is disposed, said aperture including clutch means adapted to engage with said drive gear when said rotation means is maintained in said first axial position.

15. A device according to claim 1; further including mode detecting means for producing a signal corresponding to the axial position of said rotation means.

16. A device according to claim 15; in which said mode detecting means includes tab means coupled to said rotation means and adapted to move axially therewith, and a mode detector for detecting the axial position of said tab means.

17. A device according to claim 1; further including center position detecting means for detecting a center rotational position of said rotation means when the latter is maintained in said first axial position, said center rotational position corresponding to a still motion mode of said record medium.

18. A device according to claim 17; in which said center position detecting means includes a shutter plate rotatable with said rotation means about said axis, and a center position detector for detecting the angular position of said shutter plate from said center rotational position.

19. A device according to claim 18; further including return means for returning said shutter plate to said center rotational position when said rotation means is maintained in said second axial position.

20. A device according to claim 19; further including annular friction means adapted to rotate with said rotation means about said axis and having an outer circumferential portion on which said shutter plate is mounted and having a first surface, and said return means includes at least one cam surface mounted on said first surface, roller means and biasing means for biasing said roller means into engagement with said at least one cam surface so as to return said shutter plate to said center rotational position when said rotation means is maintained in said second axial position.

21. A device according to claim 1; in which the rotation detecting means further detects the direction of rotation of the rotation means about said axis, and the direction of movement of the record medium is controlled in response to the detection of the direction of the rotation when said rotation means is maintained in said first and second axial positions.

22. A device for selecting the mode of operation of an apparatus for reproducing video signals recorded on a record medium during movement of the latter, said device comprising:
a control shaft adapted to rotate about an axis;
a control member for manually controlling the rotation of said control shaft about said axis;
latch means for maintaining said control shaft in one of a first and second axial position along said axis;
drive gear means fixedly mounted on said control shaft;
rotation detecting means for detecting the rotational speed and the angular position of said control shaft about said axis;
brake member means;

friction means having clutch means adapted to engage with said drive gear means when said control shaft is maintained in said first axial position and which is disengaged from said drive gear means when said control shaft is maintained in said second axial position;

spring means for biasing said friction means into engagement with said brake member means when said control shaft is maintained in said first axial position so as to maintain said control shaft at a desired angular position;

center position detecting means for detecting a center rotational position of said control shaft when the latter is maintained in said first axial position, said center rotational position corresponding to a still motion mode of said record medium, said center position detecting means including a shutter plate coupled to said control shaft when the latter is maintained in said first axial position; and return means for returning said shutter plate to said center rotational position when said control shaft is maintained in said second axial position.

* * * * *